US007007137B2

(12) United States Patent
Liang

(10) Patent No.: US 7,007,137 B2
(45) Date of Patent: Feb. 28, 2006

(54) METHOD AND ARCHITECTURE CAPABLE OF ACCESSING DATA AND INSTRUCTIONS USING STORE AND FORWARD

(75) Inventor: Bor-Sung Liang, Kaohsiung (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 343 days.

(21) Appl. No.: 10/418,213

(22) Filed: Apr. 18, 2003

(65) Prior Publication Data

US 2004/0049642 A1    Mar. 11, 2004

(30) Foreign Application Priority Data

Sep. 11, 2002  (TW) ............................. 91120694 A

(51) Int. Cl.
*G06F 13/14* (2006.01)
(52) U.S. Cl. ..................................... 711/138
(58) Field of Classification Search ............... 711/137, 711/138, 213
See application file for complete search history.

(56) References Cited

U.S. PATENT DOCUMENTS

| 4,742,454 | A | | 5/1988 | Robinson et al. | |
|---|---|---|---|---|---|
| 5,680,564 | A | * | 10/1997 | Divivier et al. | 712/205 |
| 5,781,926 | A | | 7/1998 | Gaskins et al. | |
| 6,055,621 | A | * | 4/2000 | Puzak | 712/207 |
| 6,292,871 | B1 | * | 9/2001 | Fuente | 711/136 |
| 6,317,810 | B1 | * | 11/2001 | Lopez-Aguado et al. | 711/120 |
| 6,523,093 | B1 | * | 2/2003 | Bogin et al. | 711/137 |
| 6,658,534 | B1 | * | 12/2003 | White et al. | 711/137 |

FOREIGN PATENT DOCUMENTS

| GB | 2 348 024 A | 9/2000 |
|---|---|---|
| WO | PCT 93/18459 | 9/1993 |

* cited by examiner

Primary Examiner—Kevin L. Ellis
(74) Attorney, Agent, or Firm—Bacon & Thomas, PLLC

(57) ABSTRACT

There is disclosed an architecture capable of accessing data and instructions of an external memory device using store and forward, which has a processor kernel, a cache module, a prefetch module, a switch, and a store and forward controller. The switch is provided for switching a connection from the processor kernel to the cache module or the prefetch module. The store and forward controller detects access between the prefetch module and the memory device, so as to command the switch to switch the connection from the processor kernel to the prefetch module when the prefetch module transfers data by burst transfer, such that data and instructions transferred from the memory device to the prefetch module are also transferred to the processor kernel.

6 Claims, 7 Drawing Sheets

METHOD AND ARCHITECTURE CAPABLE OF ACCESSING DATA AND INSTRUCTIONS USING STORE AND FORWARD

BACKGROUND OF THE INVENTION

1. Field of the Invention

The present invention relates to data and instruction access in a computer system and, more particularly, to a method and an architecture capable of accessing data and instructions using store and forward.

2. Description of Related Art

The processing speed of CPU of a modern computer has increased significantly. Furthermore, such trend of increase is still continuing. It is known that a corresponding increase in accessing memory is required for increasing the total data and/or instruction access efficiency of the computer. In other words, a relatively slow memory is a bottleneck of the efficiency increase of the computer. For solving this problem, a cache memory is thus developed, in which a memory access unit is defined to have a constant length composed of a predetermined number of instructions or data, and such unit is called a cache line. The length of the unit is critical. For example, in a memory having a burst transfer capability, multiple data accesses can be performed by only giving one address and associated setting, so that a data string having the assigned burst length is continuously transferred. As a result, an initial delay prior to data transfer is decreased. In such memory, the length of the cache line is related to the burst length.

With reference to FIG. 1, it presents schematically a conventional processor architecture having the above cache capability. As shown, in case that a cache line having the required data or instructions is in the cache module 11a, the processor kernel 14 can fetch required data or instructions from a cache module 11 directly with no or very low time delay. However, if the required data or instructions are not in the cache module 11, a cache miss is encountered. At this moment, the processor kernel 14 has to command the cache module 11 to read the required data or instructions from a memory device 13. Such an operation is called cache refill. Thus, a significant system delay (called cache miss penalty) is occurred since all cache lines have to be stored in the cache module 11.

The cache miss penalty often occurs continuously when the processor kernel 14 accesses a certain section of program codes or data section at the first time. This can adversely affect the performance of the computer system. For solving this problem, a prefetching is proposed. As shown in FIG. 2, a prefetch module 12 is provided between the cache module 11 and the memory device 13. The prefetch module 12 acts to predict possible sections of program codes or data sections to be used next by the processor kernel 14 and read the same into the prefetch module 12. Once the processor kernel 14 finds that it is unable to get required data or instructions from the cache module 11 (i.e., a cache miss occurred), the prefetch module 12 is checked to search the data or instructions. If the required data or instructions are already in the prefetch module 12, a successful access is then realized, and the required cache lines are stored in the cache module 11 by reading the same from the prefetch module 12. As a result, the cache miss penalty is greatly reduced. However, a prefetch miss still may occur if the required data or instructions are not in the prefetch module 12. It is still required to get the required cache lines from the external memory device 13. Thus, a significant system delay (called prefetch miss penalty) is occurred.

Conventionally, the architecture of the prefetch module 12 is configured to be the same as the cache module, and thus the cache line is employed as the data length of the prefetch module 12. In other words, the length of a burst transfer in a dynamic random access memory (DRAM) is taken as a data transfer unit. However, the interface either between the prefetch module 12 and the cache module 11 or between the pre-fetch module 11 and the processor kernel 14 is not a DRAM interface. Hence, it is not necessary to take the cache line as a data transfer unit. Practically, data transfer rate may be significantly lowered if the cache line is used as the data transfer unit.

Specifically, three interfaces are provided in the processor structure with cache module 11 and prefetch module 12. The first interface 15 is an external interface between the prefetch module 12 and the external memory device 13. The second interface 16 is provided between the prefetch module 12 and the cache module 11. The third interface 17 is provided between the cache module 11 and the processor kernel 14 for transferring data/instruction from the cache module 11 to the processor kernel 14. Conventionally, data transfer unit taken in each of the first and the second interfaces 15 and 16 is the same as the data length of the cache line. As for data access via the third interface 17, if it is related to data access of either first or second interface, the data access can be performed only after the cache line has been accessed. However, the data length of the cache line is not an optimum data transfer unit between the prefetch module 12 and any one of the memory device 13, the cache module 11, and the processor kernel 14. This is because a length of the cache line is related to structure of the cache module 11. Theoretically, the length of the cache line is fixed during the working cycles of the processor kernel 14. However, the processor kernel 14 is dynamic in accessing data/instruction when being executed. Hence, an optimum performance of the processor kernel 14 is not obtained if the cache line having the fixed length is taken as the data transfer unit. As a result, resources are wasted.

With reference to the timing diagram of FIG. 3, it is assumed that an instruction/data sequence required by the process kernel 14 is read sequentially from #0 instruction/data. As shown, "Init" is referred to initial delay. Instruction/data read by the prefetch module 12 is first sent to the cache module 11 and then sent to the processor kernel 14 therefrom. A cache miss is occurred in the #0 instruction/data reading. Hence, the processor kernel 14 must wait for the completion of the reading from the memory device 13 to the prefetch module 12 and a transfer of the read data from the prefetch module 12 to the cache module 11 prior to obtaining the required instruction/data. Further, a cache miss is occurred in the #4 instruction/data reading. Fortunately, the processor kernel 14 does not have to wait the completion of the reading from the memory device 13 to the prefetch module 12 and the transfer of the read data from the prefetch module 12 to the cache module 11 due to the provision of the prefetch module 12. Instead, instruction/data is sent to the cache module 11 from the prefetch module 12 directly prior to being accessed by the processor kernel 14.

With reference to FIG. 4, there is shown a timing diagram of another example. It is assumed that a reading of instruction/data sequence required by the processor kernel 14 jumps from #2 instruction/data to #80 instruction/data after the reading of #2 instruction/data has been completed. This in turn causes a cache miss in the #80 instruction/data reading. Further, a prefetch miss is occurred since the #80 instruction/data is not the same as any of the #4, #5, #6, and #7 instructions/data read by the prefetch module 12. As such, read instruction/data in the prefetch module 12 must be discarded. In response, the prefetch module 12 must be activated again for completing an instruction/data reading from the memory device 13 and transferring the read one to the cache module 11. Finally, the processor kernel 14 may access the read instruction/data. Such waiting of the processor kernel 14 may adversely affect a data transfer rate of the computer.

SUMMARY OF THE INVENTION

An object of the present invention is to provide a method and an architecture capable of accessing data and instructions using store and forward in which required data or instructions are transferred to a processor kernel prior to a prefetch miss and a reading of the same from a memory, so as to optimize a data or instruction access efficiency.

According to one aspect of the present invention, there is provided an architecture capable of accessing data and instructions of an external memory device using store and forward. The architecture comprises: a processor kernel capable of effecting a burst transfer for continuously outputting a data string having a fixed burst length for access; a cache module for storing a portion of data and instructions sent from the memory device, the stored portion of data and instructions, which is available for the processor kernel to access in a high speed; a prefetch module for predicting possible data and instructions to be used by the processor kernel, so as to read the same from the memory device and store the same therein in advance; a switch for switching a connection from the processor kernel to the cache module or the prefetch module; and a store and forward controller for detecting access between the prefetch module and the memory device, so as to command the switch to switch the connection from the processor kernel to the prefetch module when the prefetch module transfers data by burst transfer, such that data and instructions transferred from the memory device to the prefetch module are also transferred to the processor kernel.

According to another aspect of the present invention, in a processor architecture having a processor kernel, a cache module and a prefetch module, there is provided a method using store and forward for accessing data and instructions of an external memory device. The processor kernel is capable of effecting a burst transfer for continuously outputting a data string having a fixed burst length for access. The cache module stores a portion of data and instructions sent from the memory device for the processor kernel to access at a high speed. The prefetch module predicting possible data and instructions to be accessed by the processor kernel, so as to read the same from the memory device and store the same therein in advance. The method comprises the steps of: (A) the processor kernel issuing an access request for reading data and instructions by burst transfer unit, which results in a cache miss and a prefetch hit; (B) if all data and instructions of the burst transfer unit are transferred to the prefetch module, transferring the data and instructions in the prefetch module into the processor core; (C) if not all data and instructions of the burst transfer unit are transferred to the prefetch module, and the data and instructions to be read are transferred into the prefetch module, transferring the data and instructions to be read in the prefetch module into the processor core; and (D) if not all data and instructions of the burst transfer unit are transferred to the prefetch module, and the data and instructions to be read are not transferred into the prefetch module, waiting the data and instructions until being transferred into the prefetch module, and transferring the data and instructions in the prefetch module into the processor core.

Other objects, advantages, and novel features of the invention will become more apparent from the detailed description when taken in conjunction with the accompanying drawings.

DETAILED DESCRIPTION OF THE PREFERRED EMBODIMENT

Figure 5:
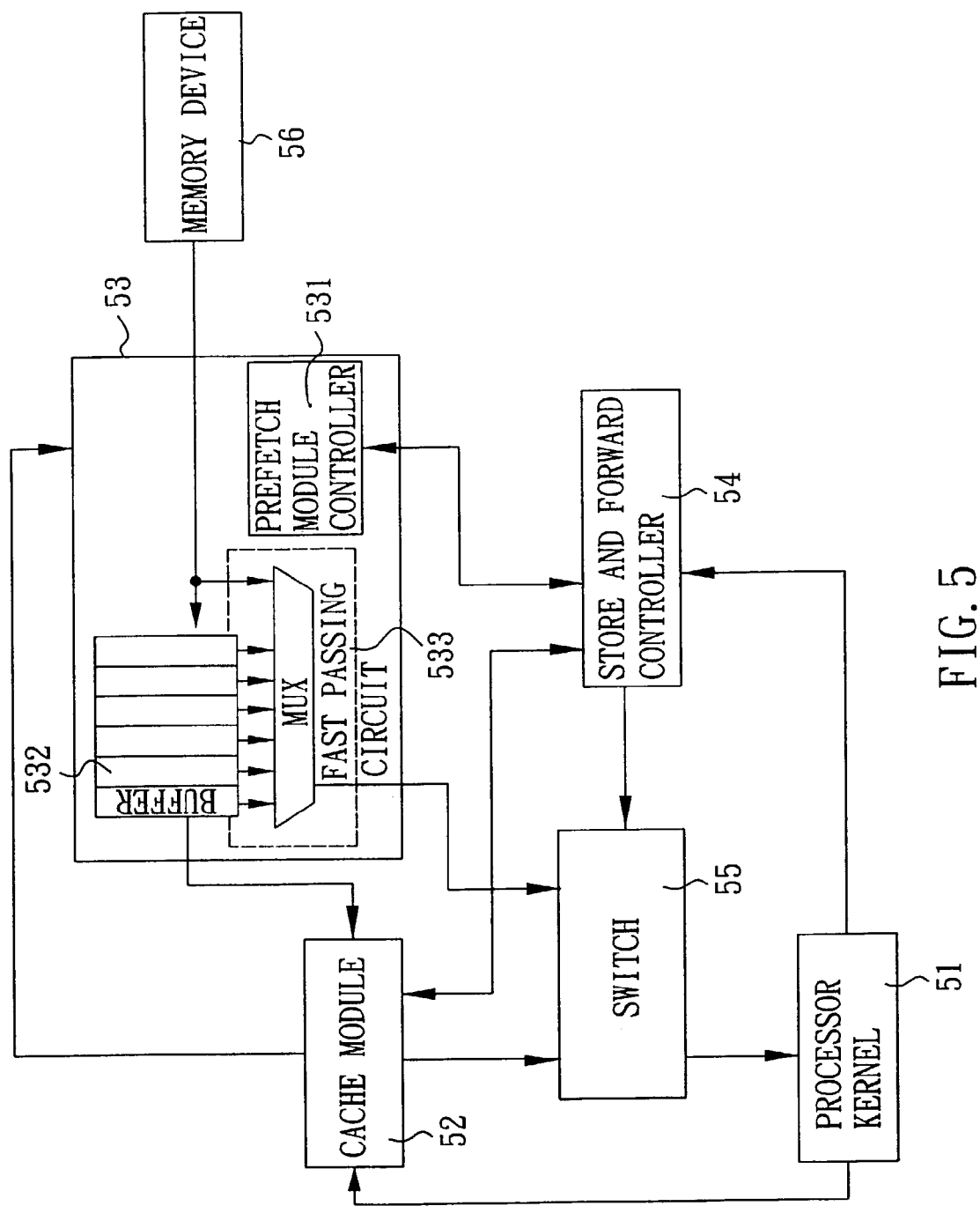
FIG. 5 schematically illustrates the architecture capable of accessing data and instructions using store and forward in accordance with the present invention.

With reference to FIG. 5, there is shown an architecture capable of accessing data and instructions using store and forward in accordance with the invention, which comprises a processor kernel 51, a cache module 52, a prefetch module 53, a store and forward controller 54, a switch 55, and an external memory device 56. In implementing a microprocessor architecture as an example, the memory device 56 is a DRAM or static RAM (SRAM). The processor kernel 51 has the capability of burst transfer for continuously outputting a data string having a fixed burst length for access.

The cache module 52 acts to store a portion of data and instructions sent from the memory device 56. The portion of data and instructions stored in the cache module 52 is available for the processor kernel 51 to access at a high speed. The prefetch module 53 acts to predict possible instructions/data to be used by the processor kernel 51 in a near future prior to reading the same from the memory device 56. The read instructions/data are stored in the prefetch module 53 consequently. As shown, the prefetch module 53 comprises a prefetch module controller 531, a buffer 532 for storing possible instructions/data to be used, and a fast passing circuit 533, which can be implemented as a multiplexor, for sending the stored instructions/data to the switch 55 as commanded by the prefetch module controller 531.

The switch 55 acts to switch a connection from the processor kernel 51 to either the cache module 52 or the prefetch module 53 under the control of the store and forward controller 54. In general, the switch 55 acts to switch a connection from the processor kernel 51 to the cache module 52. The store and forward controller 54 acts to search required address of instruction/data in an access request sent from the processor kernel 51. When the processor kernel 51 issues an access request, the store and forward controller 54 will search the cache module 52 and the prefetch module 53 for determining whether a valid instruction/data indicated by the address is existed.

Figure 6:
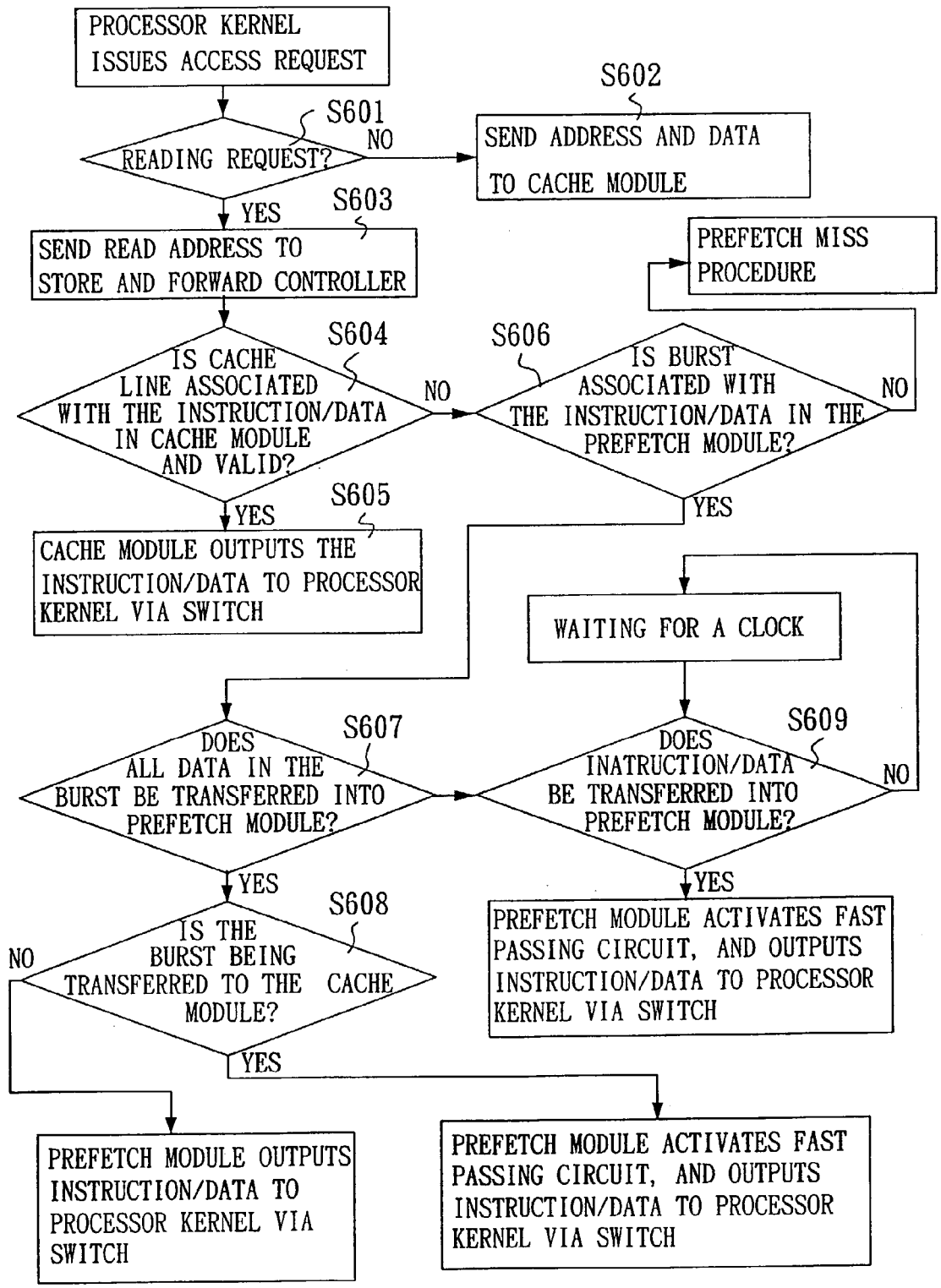
FIG. 6 is a flow chart illustrating the method capable of accessing data and instructions using store and forward in accordance with the present invention.

With reference to FIG. 6, there is shown a flow chart illustrating a process for accessing data and instructions using store and forward in accordance with the present invention. First, a determination is made on whether the access request issued from the processor kernel 51 is a reading request (step S601). If yes, the process jumps to step S603; otherwise, the process goes to step S602. In step S602, data is sent to the cache module 52 or the memory device 56 since the access request is determined to be a writing request. In step S603, the reading address is sent to the store and forward controller 54. Next, the store and forward controller 54 searches the cache module 52 and the prefetch module 53 for determining whether a valid instruction/data indicated by the address is existed in the cache module 52 or the prefetch module 53 (step S604). If yes, it indicates a cache hit and the process goes to step S605 accordingly. If not (i.e., no such instruction/data or such instruction/data is not valid if it does exist), it indicates a cache miss and the process jumps to step S606 accordingly. In step S605, the cache module 52 outputs the required instruction/data to the switch 55 which in turn sends the same to the processor kernel 51.

In step S606, a determination is made on whether a burst associated with the instruction/data is in the prefetch module 53. If not, it indicates that there is a prefetch miss at the same time. Thus, a prefetch miss procedure is activated prior to ending the process. If yes, it indicates a prefetch hit and the process goes to step S607 accordingly.

In step S607, a determination is made on whether all data in the burst has been loaded into the prefetch module 53. If yes, the process goes to step S608; otherwise, the process jumps to step S609. In step S608, a determination is made on whether the burst is being transferred to the cache module 52. If yes, a data transfer from the prefetch module 53 to the cache module 52 is not effected since the fast passing circuit 533 is an independent input/output (I/O) port. Hence, for the prefetch module 53, it is possible of outputting the instruction/data. Further, the switch 55 outputs the instruction/data sent from the prefetch module 53 to the processor kernel 51. Otherwise, the prefetch module 53 outputs the instruction/data since there is no reading/writing therein. Further, the switch 55 outputs the instruction/data sent from the prefetch module 53 to the processor kernel 51.

In step S609, a determination is made on whether the instruction/data has been loaded into the prefetch module 53. If yes, a data transfer from the prefetch module 53 to the cache module 52 is not effected since the fast passing circuit 533 is an independent I/O port. Hence, for the prefetch module 53, it is possible of outputting the instruction/data. Further, the switch 55 outputs the instruction/data sent from the prefetch module 53 to the CPU kernel 51. Otherwise, the process waits for a predetermined period of time (e.g., one clock cycle) until the required instruction/data has been loaded. Next, the process loops back to step S609. For example, it is assumed that a burst length is a length of eight instructions and a required data is a fourth record of the burst. But the prefetch module 53 just reads a second record of the burst as the processor kernel 51 issues a data reading request. This means that a waiting of two clock cycles is required until the fourth record of the burst has been read from the memory device 56 and loaded into the prefetch module 53. At the same time, the fourth record of the burst is sent to the processor kernel 51 via the fast passing circuit 533. In contrast, in a conventional access mechanism, a waiting of at least seven clock cycles is required, i.e., reading of all bursts has been completed prior to sending the burst. In view of the above, the invention (i.e., only a waiting of two clock cycles required) is advantageous over the prior art (i.e., a waiting of at least seven clock cycles required).

Hence, the invention is more efficient. In another example, in the conventional access mechanism, data in the whole cache line is required to send from the prefetch module 53 to the cache module 52 prior to permitting the CPU kernel 51 to read instruction/data from the cache module 52. Hence, it is much time consuming. In comparison, the invention is faster than the prior art.

By utilizing the above process, the processor kernel 51 does not have to wait for a data transfer from the memory device 56 to itself via the prefetch module 53 and the cache module 52. Such data transfer can spend an undesired long period of time.

Figure 1:
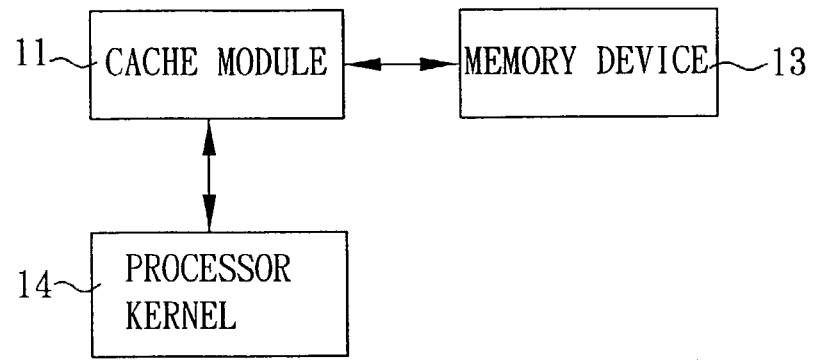
FIG. 1 schematically illustrates a conventional processor architecture having a cache capability.
Figure 2:
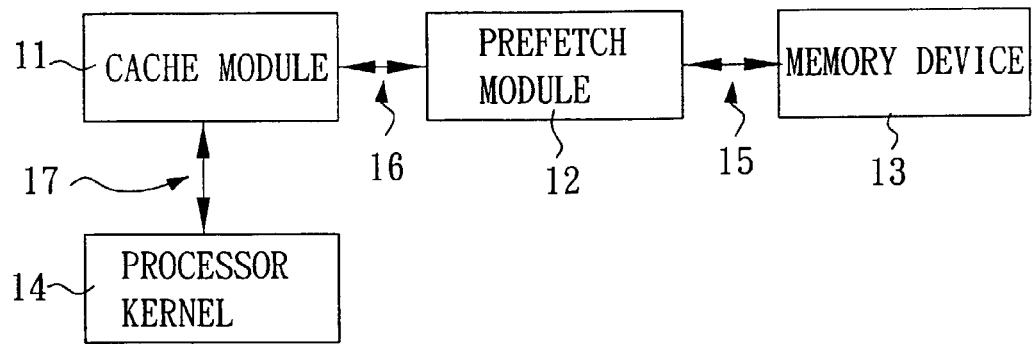
FIG. 2 schematically illustrates another conventional processor architecture having a cache capability.
Figure 3:
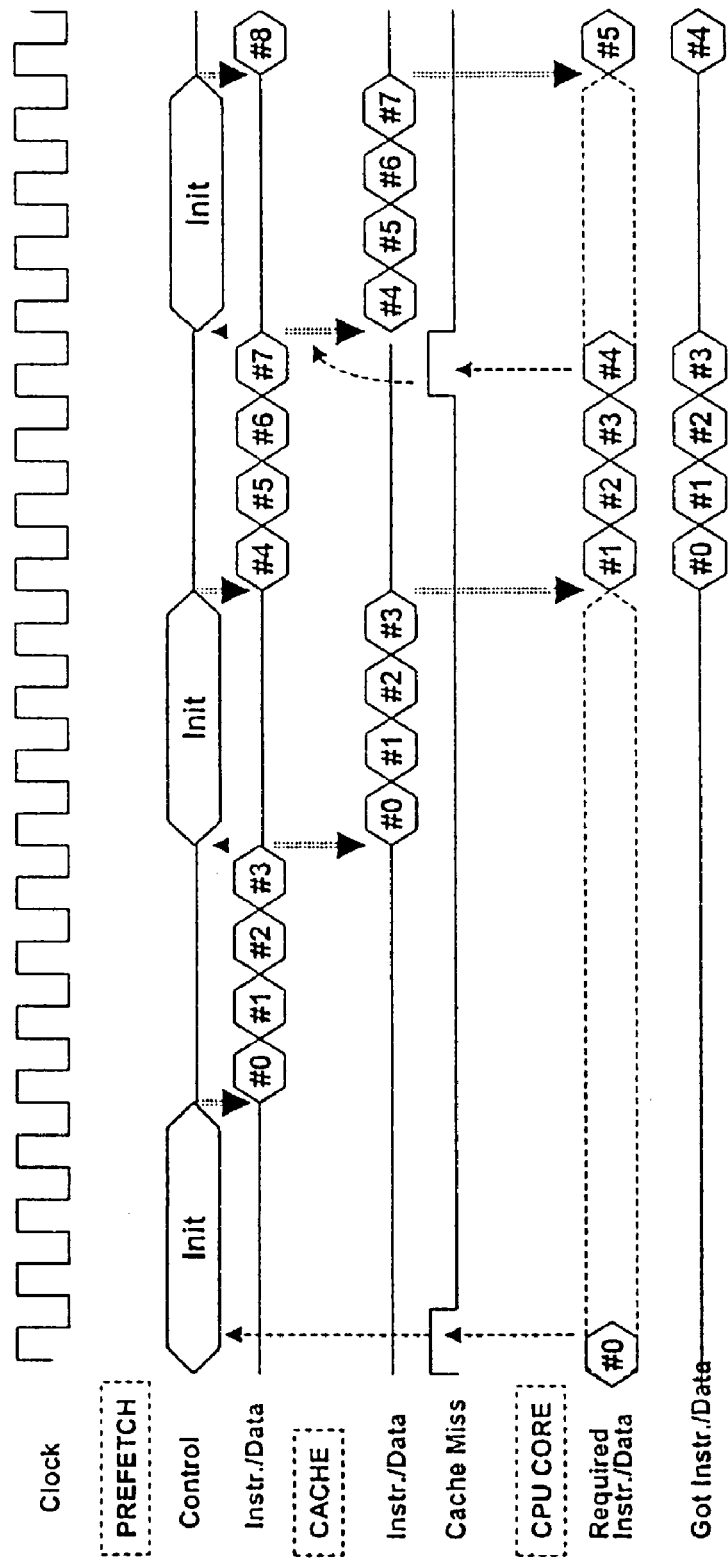
FIGS. 3 and 4 are two different timing diagrams of the processor architecture shown in FIG. 2.
Figure 4:
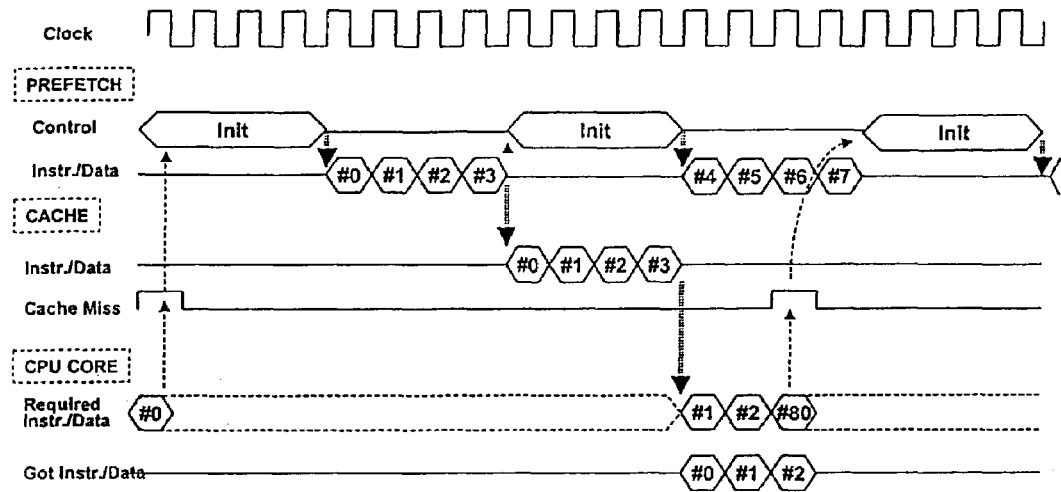
Figure 4:
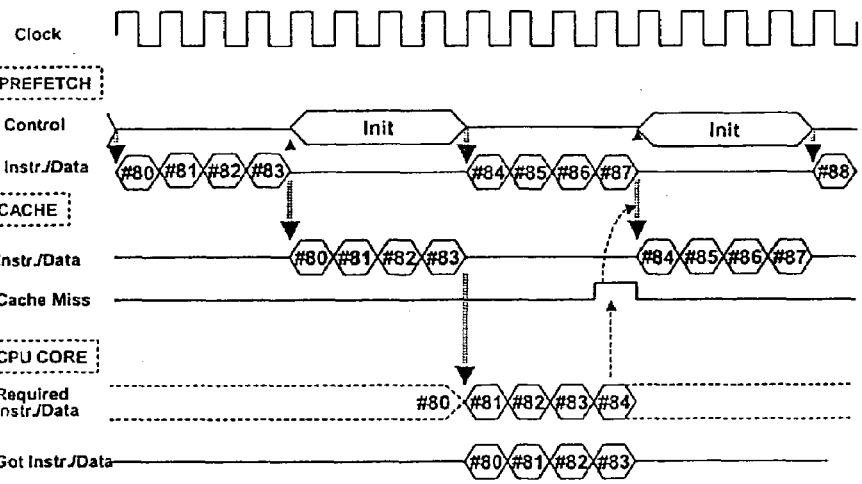

With the architecture of the present invention, the processor kernel 51 takes a single instruction or data as a unit, while each of the cache module 52 and the prefetch module 53 takes a number of instructions/data as a unit for continuous transfer. Hence, the store and forward controller 54 can output obtained instructions/data from the memory device 56 into the processor kernel 51 prior to completion of a unit data transfer by the cache module 52 and the prefetch module 53. For example, it is assumed that a burst sent from the memory device 56 to the prefetch module 53 has a length of eight instructions and the first two instructions of the burst are required by the processor kernel 51. With reference to the conventional processor structure of FIG. 2 again, the prefetch module 12 has to wait for completion of transfer of eight instructions through the first interface 15 prior to permitting the processor kernel 14 to obtain first four instructions through the second interface 16. In comparison with the processor architecture of the invention by referring to FIG. 5 again, in response to a receiving of first four instructions of the burst having a length of eight instructions in the prefetch module 53, the store and forward controller 54 commands the switch 55 to send data to the processor kernel 51.

Figure 7:
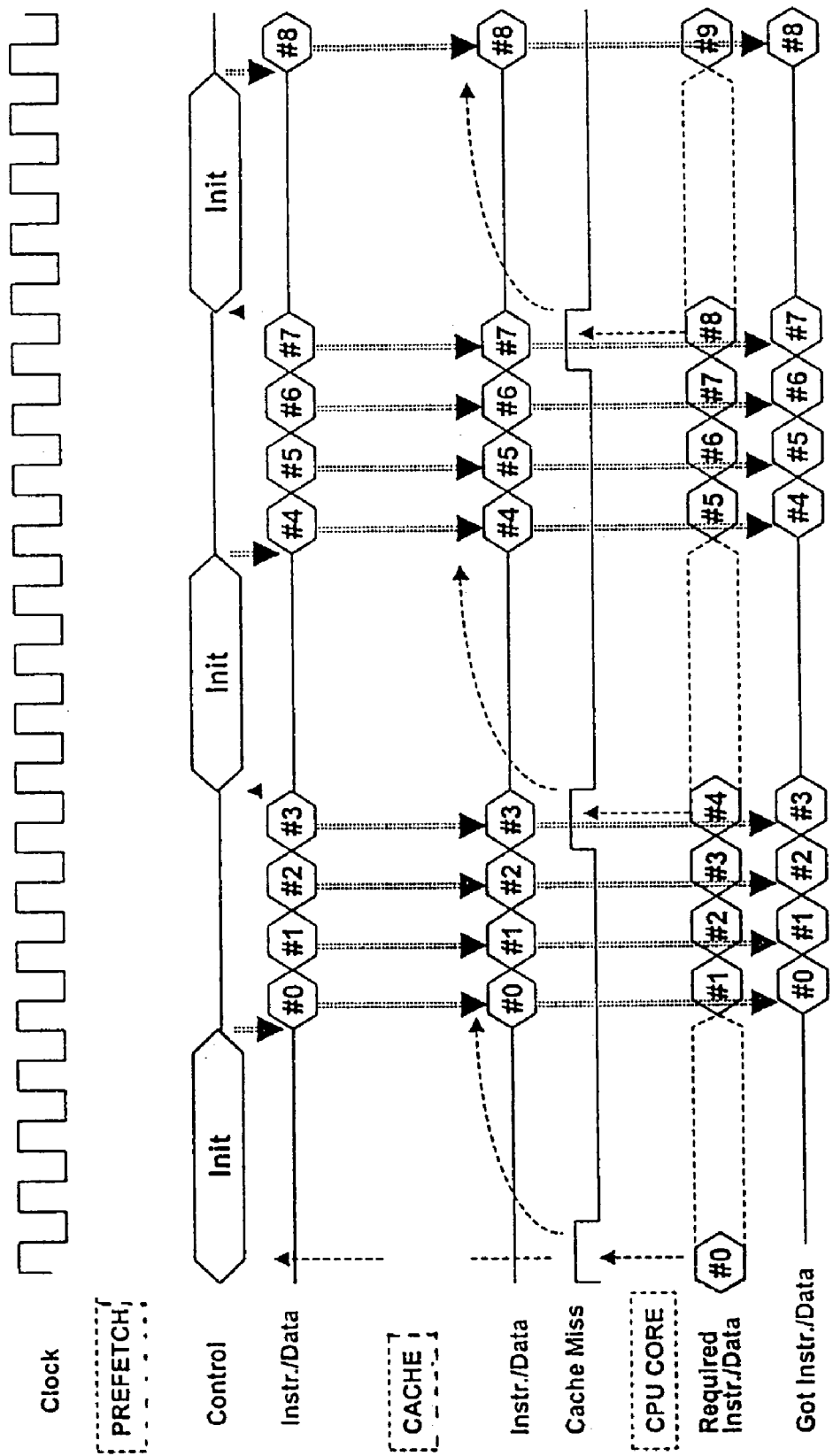
FIGS. 7 and 8 are two different timing diagrams of the architecture capable of accessing data and instructions using store and forward shown in FIG. 5.

FIG. 7 shows an exemplary timing diagram. It is assumed that an instruction/data sequence required by the processor kernel 51 is read sequentially from #0 instruction/data. As shown, "Init" is referred to initial delay. A cache miss is occurred in the #0 instruction/data reading. When #0, #1, and # 2 instructions/data are read from the memory device 56 by the prefetch module 53, the store and forward controller 54 commands the switch 55 to connect the prefetch module 53 to the processor kernel 51 in order to send the #0, #1, and # 2 instructions/data to the processor kernel 51. When a cache miss is occurred in the #4 instruction/data reading request, there is no need for waiting for a reading from the memory device 56 due to the provision of the prefetch module 53. Instead, instructions/data can be sent from the prefetch module 53 to the cache module 52 and the processor kernel 51 directly.

Figure 8:
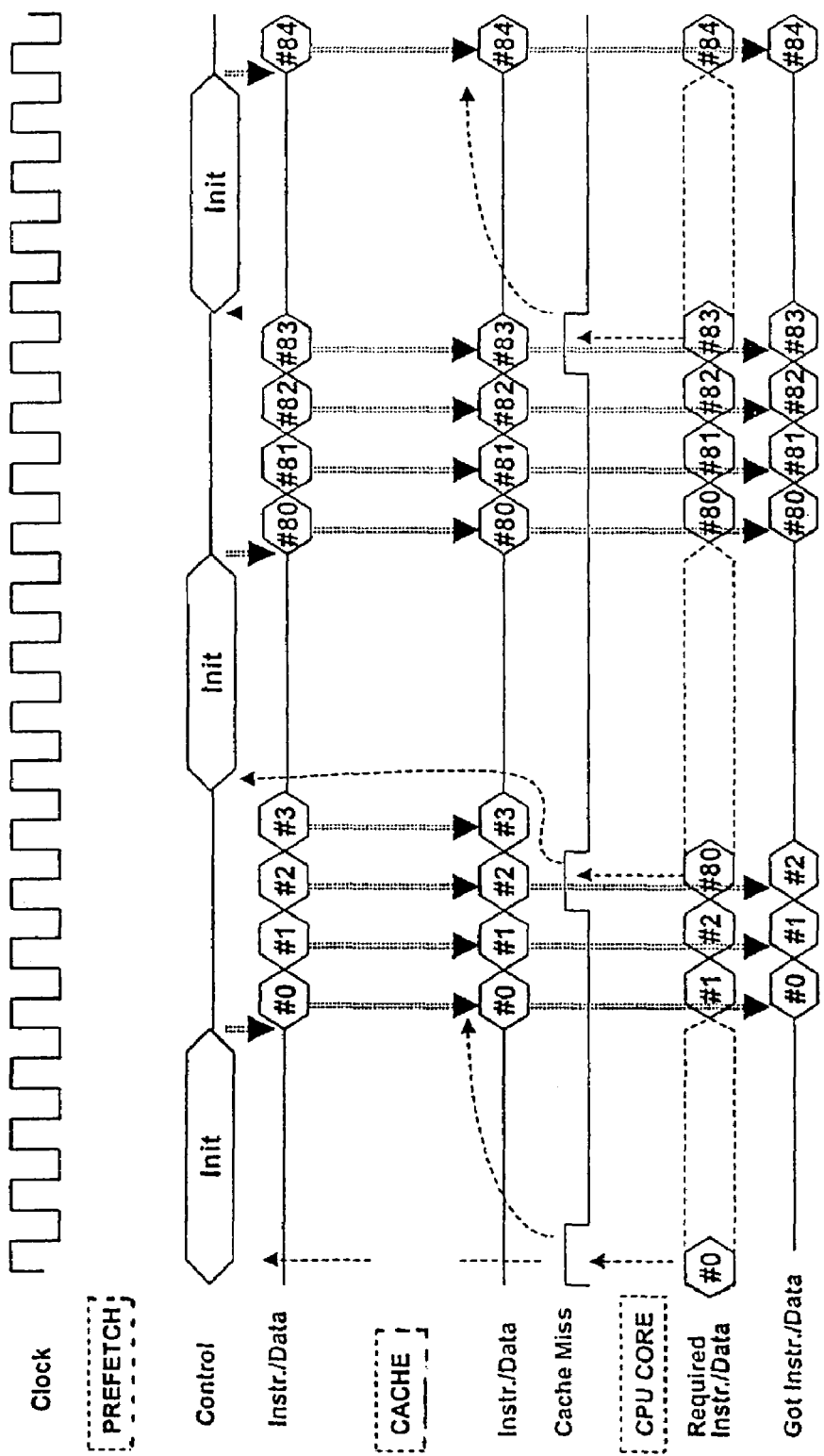

With reference to FIG. 8, there is shown a timing diagram for a discontinuous instruction/data access. It is assumed that a reading of instruction/data sequence jumps from #2 instruction/data to #80 instruction/data after the reading of #2 instruction/data has been completed. Also, instructions/data are sent from the memory device 56 to the processor kernel 51 via the prefetch module 53 in a very fast rate. When a cache miss in the #80 instruction/data reading is occurred, it is still possible of modifying the address of data as being accessed in the prefetch module 53. Thus, there is no prefetch miss occurred. Correct #80 to #83 instructions/data are thus present as the prefetch module 53 reads instruction/data from the memory device 56 in a next step. As such, a delay caused by prefetch miss is eliminated, resulting in an increase of data access efficiency.

In brief, the present invention first adjusts the store and forward controller 54, and next, as long as there is data available for use, the invention activates a data transfer between the prefetch module 53 and the processor kernel 51 even a transfer of instruction/data to the prefetch module 53 has not been completed. As a result, data access time is much reduced.

Although the present invention has been explained in relation to its preferred embodiment, it is to be understood that many other possible modifications and variations can be made without departing from the spirit and scope of the invention as hereinafter claimed.

What is claimed is:

1. An architecture capable of accessing data and instructions of an external memory device using store and forward, comprising:
   - a processor kernel capable of effecting a burst transfer for continuously outputting a data string having a fixed burst length for access;
   - a cache module for storing a portion of data and instructions sent from the memory device, the stored portion of data and instructions being available for the processor kernel to access at high speed;
   - a prefetch module for predicting possible data and instructions to be used by the processor kernel, so as to read the same from the memory device and store the same therein in advance;
   - a switch for switching a connection from the processor kernel to the cache module or the prefetch module; and
   - a store and forward controller for detecting access between the prefetch module and the memory device, so as to command the switch to switch the connection from the processor kernel to the prefetch module when the prefetch module transfers data by burst transfer, such that data and instructions transferred from the memory device to the prefetch module are also transferred to the processor kernel.

2. The architecture as claimed in claim 1, wherein the switch is normally operative to switch a connection from the processor kernel to the cache module.

3. The architecture as claimed in claim 1, wherein the processor kernel takes a single instruction or data as a unit for transfer; each of the cache module and the prefetch module takes a plurality of instructions or data as a unit for continuous transfer; and the store and forward controller is operative to output instructions and data obtained from the memory device into the processor kernel before a-completion of a unit data transfer by the prefetch module.

4. The architecture as claimed in claim 1, wherein the memory device is a DRAM.

5. The architecture as claimed in claim 1, wherein the memory device is a SRAM.

6. In a processor architecture having a processor kernel, a cache module and a prefetch module, a method of using store and forward for accessing data and instructions of an external memory device, the processor kernel being capable of effecting a burst transfer for continuously outputting a data string having a fixed burst length for access, the cache module storing a portion of data and instructions sent from the memory device for the processor kernel to access at a high speed, the prefetch module predicting possible data and instructions to be accessed by the processor kernel, so as to read the same from the memory device and store the same therein in advance, the method comprising the steps of:

(A) the processor kernel issuing an access request for reading data and instructions by burst transfer unit, which results in a cache miss and a prefetch hit;

(B) if all data and instructions of the burst transfer unit are transferred to the prefetch module, transferring the data and instructions in the prefetch module into the processor core;

(C) if not all data and instructions of the burst transfer unit are transferred to the prefetch module, and the data and instructions to be read are transferred into the prefetch module, transferring the data and instructions to be read in the prefetch module into the processor core; and (D) if not all data and instructions of the burst transfer unit are transferred to the prefetch module, and the data and instructions to be read are not transferred into the prefetch module, awaiting the data and instructions until they are transferred into the prefetch module, and transferring the data and instructions in the prefetch module into the processor core.

* * * * *